(12) United States Patent
Brown et al.

(10) Patent No.: US 11,631,313 B2
(45) Date of Patent: Apr. 18, 2023

(54) MONITORING DEVICE AND METHODS OF USE

(71) Applicant: LEEB Innovations, LLC, West Warwick, RI (US)

(72) Inventors: Leveland Brown, West Warwick, RI (US); Robert Iovino, Voluntown, CT (US); Donna Kane, North Providence, RI (US); Carl J Rennard, Lincoln, RI (US); Laura Schneider, Loveland, CO (US)

(73) Assignee: LEEB INNOVATIONS, LLC, West Warwick, RI (US)

( * ) Notice: Subject to any disclaimer, the term of this patent is extended or adjusted under 35 U.S.C. 154(b) by 39 days.

(21) Appl. No.: 17/441,845

(22) PCT Filed: Mar. 17, 2020

(86) PCT No.: PCT/US2020/023099
§ 371 (c)(1),
(2) Date: Sep. 22, 2021

(87) PCT Pub. No.: WO2020/197846
PCT Pub. Date: Oct. 1, 2020

(65) Prior Publication Data
US 2022/0189277 A1    Jun. 16, 2022

Related U.S. Application Data

(60) Provisional application No. 62/823,729, filed on Mar. 26, 2019.

(51) Int. Cl.
*G08B 21/02* (2006.01)
*A01K 11/00* (2006.01)

(52) U.S. Cl.
CPC ........ *G08B 21/0269* (2013.01); *A01K 11/008* (2013.01); *G08B 21/0266* (2013.01); *G08B 21/0286* (2013.01)

(58) Field of Classification Search
CPC ............ G08B 21/0269; G08B 21/0266; G08B 21/0286; G08B 21/02
See application file for complete search history.

(56) References Cited

U.S. PATENT DOCUMENTS 5,461,390 A * 10/1995 Hoshen .................. G08B 21/22
340/8.1
6,510,380 B1    1/2003 Curatolo et al.
(Continued)

FOREIGN PATENT DOCUMENTS

EP    17188150.1 A1    3/2019
WO    2019048580 A1    3/2019

OTHER PUBLICATIONS

Kang Min Jeong , International Search Report PCT/US2020/023099, dated Jul. 8, 2020, 8 pages, Korean Intellectual Property Office, Republic of Korea.
(Continued)

*Primary Examiner* — John A Tweel, Jr.
(74) *Attorney, Agent, or Firm* — Schneider IP Law LLC; Laura Schneider

(57) ABSTRACT

A monitoring system and related methods are disclosed. The system has a first apparatus associated with a living target, a second apparatus associated with a protected individual, and a third apparatus associated with a community individual. The first apparatus has a lock for fixing the first apparatus to the living target, a tamper-evidencing mechanism, mechanisms for monitoring a GPS location of the first apparatus, determining the first apparatus is within at least one of a first threshold distance from the second apparatus or a first threshold distance from a pre-set GPS location, (Continued)

Figure 1:
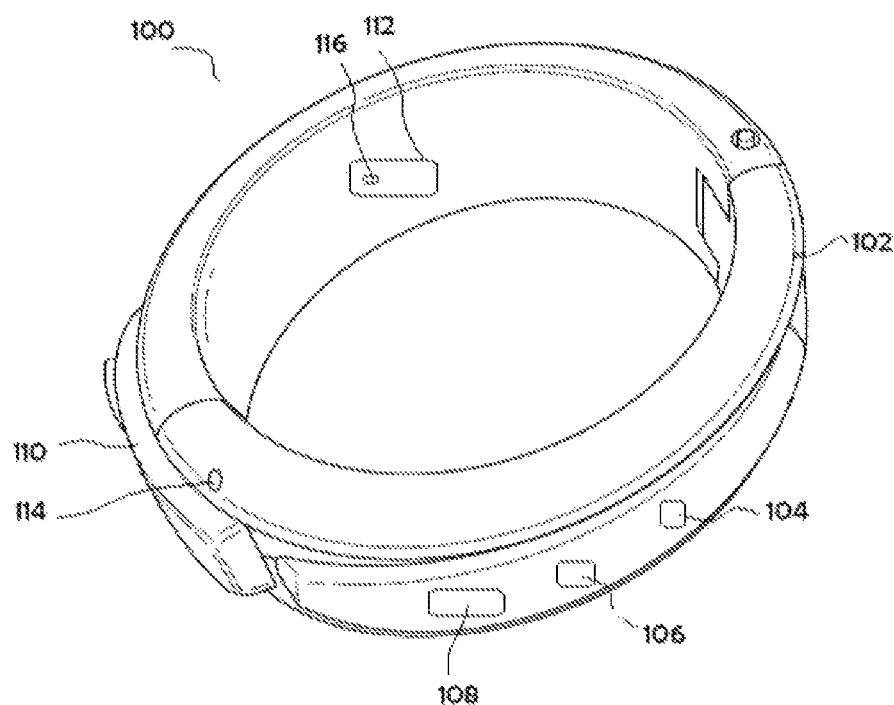

warning the living target responsive to the determining the first apparatus is within the at least one of the first threshold distance from the second apparatus or the first threshold distance from the pre-set GPS location, determining the first apparatus is in a banned location, and emitting a debilitating sound.

12 Claims, 5 Drawing Sheets

(56) References Cited

U.S. PATENT DOCUMENTS

| | | | |
|---|---|---|---|
| 6,727,817 B2 * | 4/2004 | Maloney | G08B 13/2417 340/568.2 |
| 6,800,070 B2 | 10/2004 | Mazidji et al. | |
| 6,933,851 B2 | 8/2005 | Hahne et al. | |
| 6,999,295 B2 | 2/2006 | Watkins, III et al. | |
| 7,102,870 B2 | 9/2006 | Nerheim | |
| 7,145,762 B2 | 12/2006 | Nerheim | |
| 7,570,476 B2 | 8/2009 | Nerheim | |
| 7,580,237 B2 | 8/2009 | Nerheim | |
| 7,586,733 B2 | 9/2009 | Nerheim | |
| 7,602,598 B2 | 10/2009 | Nerheim | |
| 7,782,592 B2 | 8/2010 | Nerheim | |
| 7,800,885 B2 | 9/2010 | Brundula et al. | |
| 7,916,446 B2 | 3/2011 | Nerheim | |
| 8,514,070 B2 | 8/2013 | Roper et al. | |
| 8,879,232 B2 | 11/2014 | Ziriax et al. | |
| 9,111,433 B2 | 8/2015 | Curatolo et al. | |
| 9,386,438 B2 | 7/2016 | Hymowitz | |
| 9,472,067 B1 | 10/2016 | Jentoft | |
| 9,990,831 B2 | 6/2018 | Keyton | |
| 10,007,962 B2 | 6/2018 | Brans | |
| 10,109,173 B2 | 10/2018 | Keyton | |
| 10,255,789 B2 | 4/2019 | Keyton | |
| 2005/0083195 A1 * | 4/2005 | Pham | G08B 25/016 340/574 |
| 2006/0244613 A1 | 11/2006 | Myers | |
| 2008/0001764 A1 | 1/2008 | Douglas et al. | |
| 2008/0231462 A1 * | 9/2008 | Hobart | G08B 21/22 340/573.4 |
| 2017/0202180 A1 | 7/2017 | Yang | |
| 2018/0020786 A1 | 1/2018 | Fernandes Demetrio et al. | |
| 2018/0178757 A1 | 6/2018 | Fernandes Demetrio | |
| 2021/0358281 A1 * | 11/2021 | Collier | F41H 13/0018 |

OTHER PUBLICATIONS

Kang Min Jeong , International Written Opinion PCT/US2020/023099, dated Jul. 8, 2020, 4 pages, Korean Intellectual Property Office, Republic of Korea.

* cited by examiner

MONITORING DEVICE AND METHODS OF USE

CROSS-REFERENCE TO RELATED APPLICATIONS

This application is a 371 National Stage Entry of PCT Application No. PCT/US20/23099, filed on Mar. 17, 2020 and entitled "MONITORING DEVICE AND METHODS OF USE," which claims priority to U.S. Provisional Application No. 62/823,729, filed Mar. 26, 2019 and entitled "MONITORING DEVICE AND METHODS OF USE," the entire disclosures of which are hereby incorporated by reference for all proper purposes.

FIELD

This invention is related to location monitoring. Specifically, but not intended to limit the invention, embodiments of the invention are related to location monitoring and warning.

BACKGROUND

For years, law enforcement and courts have relied on orders, typically referred to as restraining orders, to limit contact between an individual who has harmed or may harm another individual, referred to as the offender, and another individual, referred to as the victim. Typically, the offender is ordered to remain a certain distance from the victim, or to avoid the victim's residence, place of employment or education, and so forth. Restraining orders, however, are difficult to enforce, because law enforcement and/or the courts are not equipped to monitor offenders closely enough to prevent them from violating restraining orders. Offenders frequently disregard restraining orders, often resulting in harm or fear of harm for the victim.

There thus remains a need for efficient monitoring of an offender, and/or warning a victim and/or law enforcement if the offender violates a restraining order, and/or other new and innovative solutions.

Additionally, due to the increasingly-close relations between humans and protected but dangerous animals, there remains a need for efficient monitoring and safe roaming deterrence of the location of protected dangerous animals.

SUMMARY

An exemplary system has a first apparatus, the first apparatus associated with a living target; a second apparatus, the second apparatus associated with a protected individual; and a third apparatus, the third apparatus associated with a community individual. The first apparatus has (a) a lock for fixing the first apparatus to the living target; (b) a tamper-evidencing mechanism configured to at least one of destruct or emit a signal in response to a broken circuit in the first apparatus; (c) a mechanism for monitoring a GPS location of the first apparatus; (d) a mechanism for determining the first apparatus is within at least one of a first threshold distance from the second apparatus or a first threshold distance from a pre-set GPS location; (e) a mechanism for warning the living target responsive to the determining the first apparatus is within the at least one of the first threshold distance from the second apparatus or the first threshold distance from the pre-set GPS location; (f) a mechanism for determining the first apparatus is in a banned location, wherein the banned location comprises at least one of a second threshold distance from the second apparatus or a second threshold distance from the pre-set GPS location, wherein the second threshold distance from the second apparatus is less than the first threshold distance from the second apparatus, and wherein the second threshold distance from the pre-set GPS location is less than the first threshold distance from the pre-set GPS location; (g) a mechanism for emitting a debilitating sound responsive to the determining the first apparatus is in the banned location; (h) a mechanism for visually marking the living target responsive to the determining the first apparatus is in the banned location, wherein the mechanism for visually marking the living target is a light; and (i) a communication means for communicating a GPS location of the living target to at least the second apparatus and the third apparatus responsive to the determining the first apparatus is in the banned location. The second apparatus has (a) a communication means for receiving the GPS location from the first apparatus; and (b) a communicant means for communicating a GPS location of the second apparatus to the third apparatus. The third apparatus has a communication means for receiving the GPS location of the first apparatus and the GPS location of the second apparatus.

An exemplary method includes providing a first apparatus, the first apparatus associated with a living target; providing a second apparatus, the second apparatus associated with a protected individual; and providing a third apparatus, the third apparatus associated with a community individual. The exemplary method further includes determining the first apparatus is within at least one of the first threshold distance from the second apparatus or the first threshold distance from the pre-set GPS location; responsive to the determining the first apparatus is within the at least one of the first threshold distance from the second apparatus or the first threshold distance from the pre-set GPS location, warning the living target; determining the first apparatus is in the banned location; and responsive to determining the first apparatus is in the banned location, communicating the GPS location of the first apparatus to the second apparatus and the third apparatus, and communicating the GPS location of the second apparatus to the third apparatus.

BRIEF DESCRIPTION ON THE DRAWINGS

Figure 2:
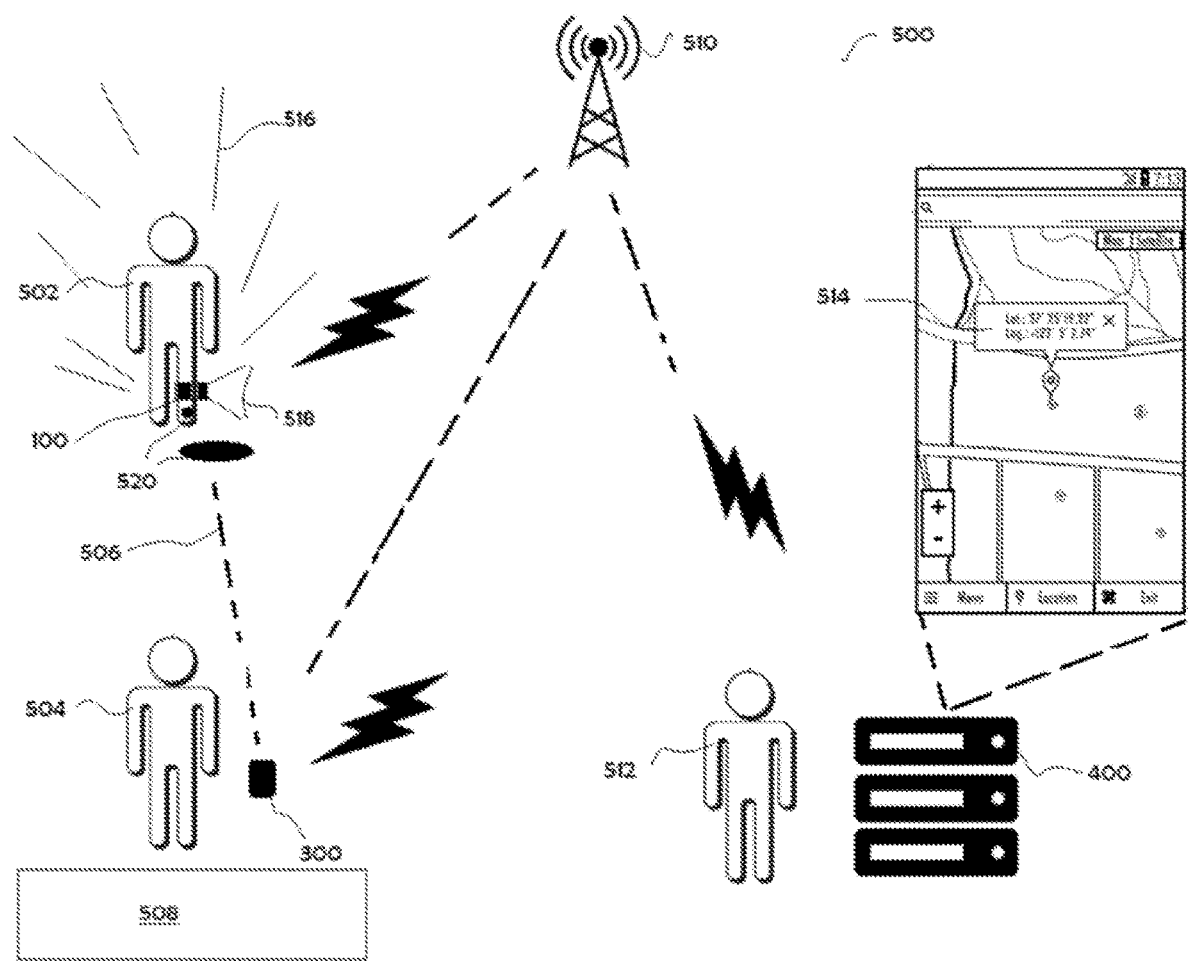
Figure 3:
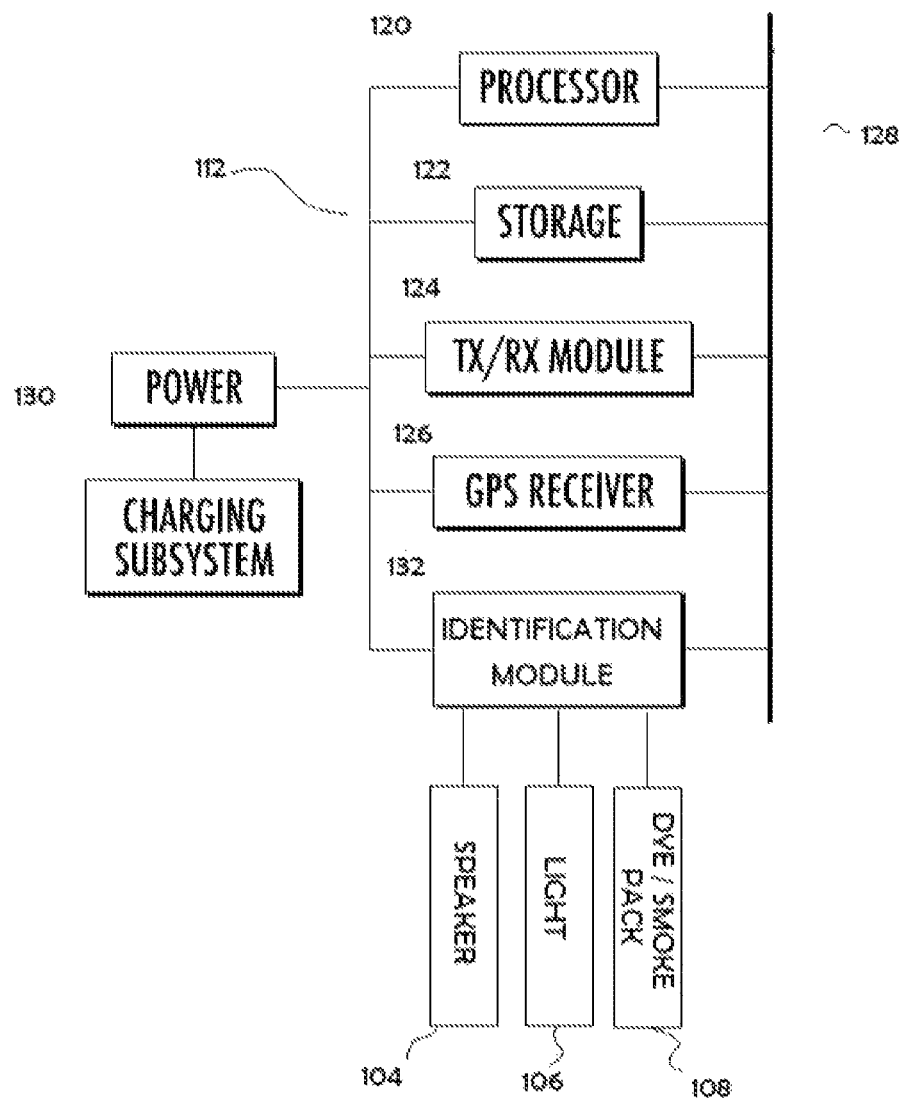
Figure 4:
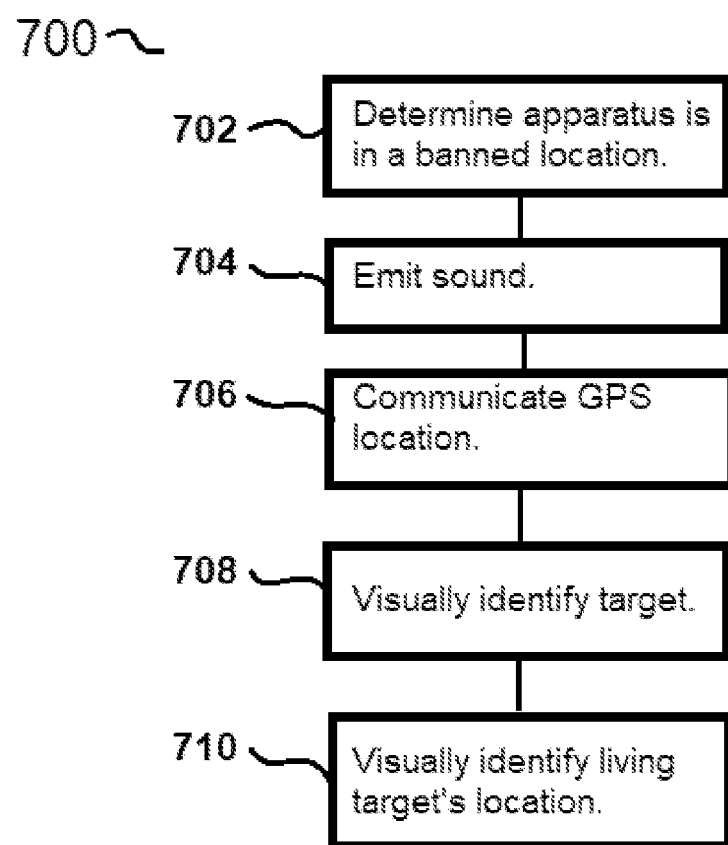
Figure 5:
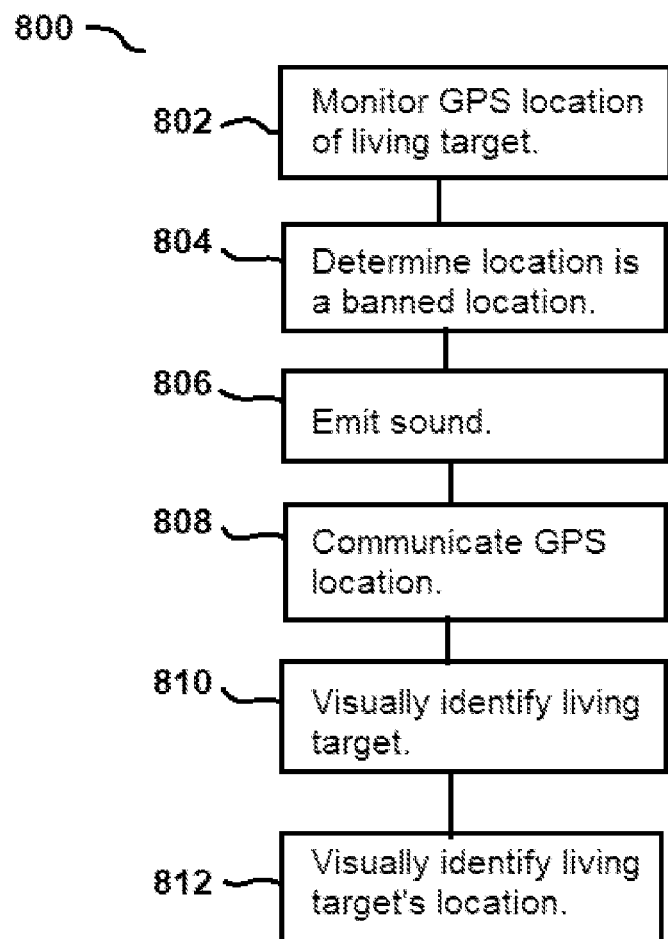

FIG. 1 is a perspective view of a monitoring apparatus;
FIG. 2 is a schematic of a monitoring system;
FIG. 3 is a schematic of components of the apparatus in FIG. 1;
FIG. 4 is a flow chart of an exemplary method; and
FIG. 5 is a flow chart of an exemplary method.

DETAILED DESCRIPTION

Referring to FIG. 1, a monitoring apparatus 100 is now described. The apparatus 100 may have a housing 102. The housing 102 may be a mechanism configured to fix the apparatus 100 to a living target, such as a person. The person (not illustrated) may be an offender, such as a person who has committed an act of domestic violence requiring monitoring, such as by law enforcement and/or a victim or potential victim. In some embodiments, the living target may be an animal, such as a dog. The dog may be one that requires monitoring, such as an aggressive dog. The housing 102 may be configured to fix the apparatus 100 to a limb of the living target. The housing 102 may be configured to fix the apparatus 100 to a torso of the living target. The housing 102 may be configured to fix the apparatus 100 to a neck of the living target.

The apparatus 100 may include a lock 110. The lock 110 may be configured for operation by a monitoring individual such as law enforcement, animal control, and/or an animal owner. The lock 110 may be configured so as to allow the monitoring individual to fix or remove the apparatus 100 from the offender, animal, or living target.

The housing 102 may include a tamper-evidencing mechanism 114. The tamper-evidencing mechanism 114 may include any mechanism known to those skilled in the art. The tamper-evidencing mechanism 114 may include a mechanism that destructs or emits a signal when tampered. For example, a signal may be emitted if the offender or animal breaks a circuit in the apparatus 100.

In some embodiments, the apparatus 100 includes a control module 112 (see also FIG. 3). The control module 112 may include a processor, a storage, a transmitter/receiver module, a GPS receiver, all interconnected via a system bus. The control module 112 may include or may be operatively coupled to a power source (not illustrated), such as, without limitation, a battery power source (not illustrated). The storage may include non-transitory computer-readable instructions that, when executed, cause the apparatus 100 to execute a method as described in other sections of this document.

Continuing with FIG. 1, the apparatus 100 may include a speaker 104. The speaker 104 may be configured to emit a sound in response to a signal from the control module 112. The speaker 104 may be configured to emit a sound that is a debilitating sound. The debilitating sound may be a sound having a decibel (dB) level that is greater than a threshold level. The debilitating sound may include a plurality of tones. The plurality of tones may be greater in number than a threshold number of plurality of tones. The threshold dB level may be one that is selected so as to cause the living target, animal, or offender to be temporarily impaired. The threshold dB level may be 90 dB or more. The threshold dB level may be 120 dB or more. The threshold dB level may be 130 dB or more. The threshold dB level may be 140 dB or more.

The plurality of tones may include a plurality of tones selected to irritate a human, such as a plurality of tones having frequencies of between 1 kHz and 10 kHz. The plurality of tones may include a plurality of tones having frequencies of between 2 kHz and 5 kHz. The plurality of tones may include a plurality of tones selected to irritate an animal. The plurality of tones may include at least one tone having a frequency of between 23 and 54 kHz, for example, to irritate a dog.

The plurality of tones may include a spectrum of tones emitted at the same time. The plurality of tones may include a spectrum of tones emitted at different times. The plurality of tones may include a plurality of tones that change in a pseudo-random fashion.

The control module 112 and/or computer-readable instructions may be configured to cause the speaker 104 to emit the debilitating sound for a period of time. The period of time may be 2 minutes or more. The period of time may be between 3 minutes and 5 minutes. The period of time may be 4 minutes or more.

The control module 112 and/or computer-readable instructions may be configured to cause the speaker 104 to cycle between different tones in a non-predictable or pseudo-random fashion. In a non-limiting example, the control module 112 and/or computer-readable instructions may be configured to cause the speaker 104 to cycle between ten different tones, with each one of the ten different tones lasting for a different period of time.

The control module 112 and/or computer-readable instructions may be configured to cause the speaker 104 to cycle between decibel levels in a non-predictable fashion. In a non-limiting example, the control module 112 and/or computer-readable instructions may be configured to cause the speaker 104 to cycle between ten different dB levels, with each one of the ten different tones lasting for a different period of time.

The control module 112 and/or computer-readable instructions may be configured to cause the dB level and the tone to change at different times.

The debilitating sound as described herein may be configured to confuse and stop a target from moving forward.

Continuing with FIG. 1, the apparatus 100 may include a mechanism 106 for visually marking the living target, animal, or offender. The mechanism 106 may include a light. The light may be responsive to a signal from the control module 112. The light may be a bright light. The light may be a strobe LED light. The light may be a light with a high illuminance. The light may have a variable illuminance. The illuminance may be 250 Lux or more. The illuminance may be 500 Lux or more. The illuminance may be 750 Lux or more. The illuminance may be 1,000 Lux or more. The illuminance may be 5,000 Lux or more. The light may have a brightness. The brightness may be 1,500 Lumens or more. The brightness may be 3,000 Lumens or more.

Continuing with FIG. 1, the apparatus 100 may include a mechanism 108 for visually marking the living target, offender, or animal, and/or a location of the living target, offender, or animal. The mechanism 108 for visually marking may include paint, dye, and/or smoke. The mechanism 108 may be responsive to a signal from the control module 112. The mechanism 108 may be configured to release paint, dye, and/or smoke to visually mark the target and/or the target's surroundings so as to evidence the location of the target at a time of deployment of the mechanism 108. The mechanism 108 may include a dye pack. The mechanism 108 may include a low viscosity paint under pressure. The mechanism 108 may include a chemical pack. The dye pack, paint, and/or chemical pack may be configured to explode in response to a signal from the control module 112 to visually mark the location of the target at the time of explosion, for example, to evidence that the target was, at the time of activation, within a banned location, such as on a victim's property, at a victim's place of employment, and/or within a threshold radius of a victim.

With continued reference to FIG. 1, the apparatus 110 may include a control module 112 having a communication mechanism 116. The communication mechanism 116 may be configured to emit a signal to another device. For example, the mechanism 116 may include a communication means for communicating a location of the living target to law enforcement, a victim, or, in the case of an animal, the animal's owner and/or animal control. The communication means may include a cellular network, a peer-to-peer network, a Bluetooth network, a radio signal, an infrared signal, and/or any other communication means known to those skilled in the art.

The apparatus 100 may have a mechanism for fixing the housing to a living target, a mechanism for monitoring a location of the apparatus, a mechanism for determining the apparatus is in a banned location, and a mechanism for emitting a debilitating sound responsive to the determining the apparatus is in a banned location.

Turning now to FIG. 2, a system 500 is now described. The system 500 may include an apparatus 100 for monitoring a living target 502, such as a person under restraining orders to remain away from an individual and/or a particular location, or an animal requiring restraint from another individual or physical location. The monitoring apparatus 100 may be fixed to the living target 502. The system 500 may further include a first communications receiving mechanism 300. The mechanism 300 may be a device associated with a protected individual or location 504. For example only, the mechanism 300 may be a device that is transportable with the individual 504 or is stationary with a geographic location 508, such as a residence or workplace of the individual 504. The mechanism 300 may include a cellular device, a smart wireless device, a radio device, a wired device, or any communications mechanism known to those skilled in the art. The apparatus 100 may be configured to communicate directly with the device 300 by way of a peer-to-peer network or any other direct communication means 506 such as those known to those skilled in the art.

The apparatus 100 may be configured to indirectly communicate with the mechanism 300 and/or a second communications receiving mechanism 400 by way of a cellular network 510. The apparatus 100 may communicate a GPS location 514 to a second communications receiving mechanism 400 such as a computing device operated by an enforcement individual 512 such as law enforcement or animal control.

The apparatus 100 may be configured to indicate to the mechanism 300 and/or the mechanism 400 that the apparatus 100 (and thus the living target 502) is within a predetermined threshold distance of the mechanism 300 (and thus the protected individual 504 or banned geographical location or area 508). The predetermined threshold distance may be a first distance of between about 50 yards and about 200 yards. The predetermined threshold distance may be a first distance of between 50 meters and 200 meters.

The apparatus 100 may be configured to emit a warning sound to the living target 502 to indicate when the apparatus 100 is within a warning distance of the mechanism 300. The warning distance may be a second distance greater than the first distance.

The apparatus 100 may be configured to simultaneously perform two or more of: (a) communicate the GPS location 514, (b) emit a debilitating sound 516 to stun the living target 502, shine a light 518 to visually identify the living target 502, or (c) release a marker 520 to visually identify the physical location of the living target 502 at the time of activation. The marker 520 may be a dye, a paint, and/or a smoke.

The system 500 may include the apparatus 100, the mechanism 300, and a mechanism 506, 510 for communicating from the apparatus 100 to the mechanism 300.

Turning now to FIG. 3, in some embodiments, the apparatus 100 includes a control module 112. The control module 112 may include a processor 120, a storage 122, a transmitter/receiver module 124, a GPS receiver 126, all interconnected via a system bus 128. The control module 112 may include or may be operatively coupled to a power source 130, such as, without limitation, a battery power source (not illustrated) or charging system. The storage 122 may include non-transitory computer-readable instructions that, when executed, cause the apparatus 100 to execute a method 700 illustrated in FIG. 4. The apparatus 100 may further include an identification module 132. The identification module 132 may include or be operatively coupled to one or more of a sound emitting means such as a speaker 104, an identifying means such as a light 106, or an identifying means such as a dye pack and/or a smoke pack 108. The identification module 132 may include or be operatively coupled to two or more of a sound emitting means such as a speaker 104, an identifying means such as a light 106, or an identifying means such as a dye pack and/or a smoke pack 108. The identification module 132 may include or be operatively coupled to a sound emitting means such as a speaker 104, an identifying means such as a light 106, and an identifying means such as a dye pack and/or a smoke pack 108.

Turning now to FIG. 4, the method 700 may include determining 702 that the apparatus 100 is in a banned location. The banned location may be a location within a threshold distance of another device, or the banned location may be a location within a threshold distance of a pre-set GPS location. Responsive to the determining, the method 700 may include one or more of emitting 704 a sound, communicating 706 the GPS location of the apparatus 100 to another device, visually marking 708 the living target, or visually marking 710 the living target's location. The method 700 may be performed using an apparatus such as the apparatus 100 described herein.

With reference now to FIG. 5, a method 800 of enforcing restraining orders is now described. The method 800 may include monitoring 802 an individual's location, determining 804 the individual is in a banned location, emitting 806 a sound responsive to the determining 804, communicating 808 the individual's GPS location responsive to the determining 804, visually marking 810 the individual responsive to the determining 804, and/or visually marking 812 the individual's location responsive to the determining 804. The method 800 may be performed using an apparatus 100 and/or system 500 as described herein.

Each of the various elements disclosed herein may be achieved in a variety of manners. This disclosure should be understood to encompass each such variation, be it a variation of an embodiment of any apparatus embodiment, a method or process embodiment, or even merely a variation of any element of these. Particularly, it should be understood that the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled.

As but one example, it should be understood that all action may be expressed as a means for taking that action or as an element which causes that action. Similarly, each physical element disclosed should be understood to encompass a disclosure of the action which that physical element facilitates. Regarding this last aspect, the disclosure of a "fastener" should be understood to encompass disclosure of the act of "fastening"—whether explicitly discussed or not—and, conversely, were there only disclosure of the act of "fastening", such a disclosure should be understood to encompass disclosure of a "fastening mechanism". Such changes and alternative terms are to be understood to be explicitly included in the description.

Moreover, the claims shall be construed such that a claim that recites "at least one of A, B, or C" shall read on a device that requires "A" only. The claim shall also read on a device that requires "B" only. The claim shall also read on a device that requires "C" only.

Similarly, the claim shall also read on a device that requires "A+B". The claim shall also read on a device that requires "A+B+C", and so forth.

The claims shall also be construed such that any relational language (e.g. perpendicular, straight, parallel, flat, etc.) is understood to include the recitation "within a reasonable manufacturing tolerance at the time the device is manufactured or at the time of the invention, whichever manufacturing tolerance is greater".

Those skilled in the art can readily recognize that numerous variations and substitutions may be made in the invention, its use and its configuration to achieve substantially the same results as achieved by the embodiments described herein.

Accordingly, there is no intention to limit the invention to the disclosed exemplary forms. Many variations, modifications and alternative constructions fall within the scope and spirit of the invention as expressed in the claims.

What is claimed is:

1. A monitoring system, comprising:
a first apparatus, the first apparatus associated with a living target;
a second apparatus, the second apparatus associated with a protected individual; and
a third apparatus, the third apparatus associated with a community individual; wherein
the first apparatus has
(a) a lock for fixing the first apparatus to the living target;
(b) a tamper-evidencing mechanism configured to at least one of destruct or emit a signal in response to a broken circuit in the first apparatus;
(c) a mechanism for monitoring a GPS location of the first apparatus;
(d) a mechanism for determining the first apparatus is within at least one of a first threshold distance from the second apparatus or a first threshold distance from a pre-set GPS location;
(e) a mechanism for warning the living target responsive to the determining the first apparatus is within the at least one of the first threshold distance from the second apparatus or the first threshold distance from the pre-set GPS location;
(f) a mechanism for determining the first apparatus is in a banned location, wherein the banned location comprises at least one of a second threshold distance from the second apparatus or a second threshold distance from the pre-set GPS location, wherein the second threshold distance from the second apparatus is less than the first threshold distance from the second apparatus, and wherein the second threshold distance from the pre-set GPS location is less than the first threshold distance from the pre-set GPS location;
(g) a mechanism for emitting a debilitating sound responsive to the determining the first apparatus is in the banned location;
(h) a mechanism for visually marking the living target responsive to the determining the first apparatus is in the banned location, wherein the mechanism for visually marking the living target is a light;
(i) a communication means for communicating a GPS location of the living target to at least the second apparatus and the third apparatus responsive to the determining the first apparatus is in the banned location;
the second apparatus has
(a) a communication means for receiving the GPS location from the first apparatus; and
(b) a communicant means for communicating a GPS location of the second apparatus to the third apparatus; and wherein
the third apparatus has
(a) a communication means for receiving the GPS location of the first apparatus and the GPS location of the second apparatus.

2. The apparatus of claim 1, wherein:
the debilitating sound has a decibel level of 120 decibels or more.

3. The apparatus of claim 1, wherein:
the debilitating sound comprises a spectrum of sound having a plurality of tones.

4. The apparatus of claim 3, wherein:
the plurality of tones comprises a first tone having a first frequency of between 2 kHz and 5 kHz and a second tone having a second frequency different from the first frequency, the second frequency between 2 kHz and 5 kHz.

5. The apparatus of claim 1, wherein:
the debilitating sound comprises a plurality of tones having a first tone having a first frequency of between 2 kHz and 5 kHz and a second tone having a second frequency different from the first frequency, the second frequency between 2 kHz and 5 kHz.

6. The system of claim 1, wherein:
the first apparatus has a mechanism for visually marking the location of the living target responsive to the determining the first apparatus is in the banned location.

7. The system of claim 6, wherein:
the mechanism for visually marking the location of the living target comprises at least one of a dye pack or a smoke pack.

8. A method, comprising:
providing a first apparatus, the first apparatus associated with a living target;
providing a second apparatus, the second apparatus associated with a protected individual; and
providing a third apparatus, the third apparatus associated with a community individual; wherein
the first apparatus has
(a) a lock for fixing the first apparatus to the living target;
(b) a tamper-evidencing mechanism configured to at least one of destruct or emit a signal in response to a broken circuit in the first apparatus;
(c) a mechanism for monitoring a GPS location of the first apparatus;
(d) a mechanism for determining the first apparatus is within at least one of a first threshold distance from the second apparatus or a first threshold distance from a pre-set GPS location;
(e) a mechanism for warning the living target responsive to the determining the first apparatus is within the at least one of the first threshold distance from the second apparatus or the first threshold distance from the pre-set GPS location;
(f) a mechanism for determining the first apparatus is in a banned location, wherein the banned location comprises at least one of a second threshold distance from the second apparatus or a second threshold distance from the pre-set GPS location, wherein the second threshold distance from the second apparatus is less than the first threshold distance from the second apparatus, and wherein the second threshold distance from the pre-set GPS location is less than the first threshold distance from the pre-set GPS location;
(g) a mechanism for emitting a debilitating sound responsive to the determining the first apparatus is in the banned location;

(h) a mechanism for visually marking the living target responsive to the determining the first apparatus is in the banned location, wherein the mechanism for visually marking the living target is a light;
(i) a communication means for communicating a GPS location of the living target to at least the second apparatus and the third apparatus responsive to the determining the first apparatus is in the banned location;

the second apparatus has (a) a communication means for receiving the GPS location from the first apparatus; and
(b) a communicant means for communicating a GPS location of the second apparatus to the third apparatus; and the third apparatus has (a) a communication means for receiving the GPS location of the first apparatus and the GPS location of the second apparatus; and wherein the method further comprises determining the first apparatus is within at least one of the first threshold distance from the second apparatus or the first threshold distance from the pre-set GPS location;

responsive to the determining the first apparatus is within the at least one of the first threshold distance from the second apparatus or the first threshold distance from the pre-set GPS location, warning the living target;

determining the first apparatus is in the banned location; and responsive to determining the first apparatus is in the banned location, communicating the GPS location of the first apparatus to the second apparatus and the third apparatus, and communicating the GPS location of the second apparatus to the third apparatus.

9. The method of claim 8, wherein:
the debilitating sound has a decibel level of 120 decibels or more.

10. The method of claim 8, wherein:
the debilitating sound comprises a spectrum of sound having a plurality of tones having a first frequency of between 2 kHz and 5 kHz and a second tone having a second frequency different from the first frequency, the second frequency between 2 kHz and 5 kHz.

11. The method of claim 8, further comprising:
responsive to the determining, visually marking a physical location of the living target.

12. The method of claim 11, wherein:
the visually marking the physical location of the living target comprises activating at least one of a dye pack or a smoke pack.

\* \* \* \* \*